(12) United States Patent
Li et al.

(10) Patent No.: US 10,600,272 B2
(45) Date of Patent: Mar. 24, 2020

(54) INTELLIGENT SCHEDULING SYSTEMS AND METHODS FOR VENDING ROBOTS

(71) Applicant: BOE Technology Group Co., Ltd., Beijing (CN)

(72) Inventors: Yue Li, Beijing (CN); Haijun Su, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 205 days.

(21) Appl. No.: 15/679,590

(22) Filed: Aug. 17, 2017

(65) Prior Publication Data
US 2018/0068514 A1 Mar. 8, 2018

(30) Foreign Application Priority Data
Sep. 8, 2016 (CN) .......................... 2016 1 0809581

(51) Int. Cl.
G07F 11/00 (2006.01)
G06Q 10/06 (2012.01)
G06Q 30/06 (2012.01)

(52) U.S. Cl.
CPC ..... *G07F 11/002* (2013.01); *G06Q 10/06315* (2013.01); *G06Q 30/0635* (2013.01)

(58) Field of Classification Search
CPC ......... G07F 11/00; G06Q 10/06; G06Q 30/06
USPC .................................................. 700/231–244
See application file for complete search history.

(56) References Cited

U.S. PATENT DOCUMENTS 9,776,324 B1* 10/2017 Johnson ................ B25J 9/1666
10,065,321 B2* 9/2018 Miyashita ............ B25J 11/008
10,201,898 B2 2/2019 Gu et al.
(Continued)

FOREIGN PATENT DOCUMENTS

CN 105479462 A 4/2016
CN 105892321 A 4/2016
WO 2015120384 A1 8/2015

OTHER PUBLICATIONS

First Office Action, including Search Report, for Chinese Patent Application No. 201610809581.2, dated Feb. 22, 2019, 14 pages.
(Continued)

*Primary Examiner* — Michael Collins
(74) *Attorney, Agent, or Firm* — Westman, Champlin & Koehler, P.A.

(57) ABSTRACT

The present application provides an intelligent scheduling system for vending robots and a corresponding method. The system comprises: at least one video monitor, configured to acquire a population image of a plurality of regions and obtain population density information of the plurality of regions by performing image processing on the population image; and a scheduling control server configured to allocate at least one vending robot to the plurality of regions according to the population density information of the plurality of regions and transmit, to the allocated at least one vending robot, a scheduling instruction which specifies a position of a region to which it is allocated, wherein the at least one vending robot is configured to autonomously move to the position of the region to which it is allocated for selling goods according to the scheduling instruction which specifies the position of the region from the scheduling control background server.

12 Claims, 4 Drawing Sheets

(56) References Cited

U.S. PATENT DOCUMENTS

| | | | |
|---|---|---|---|
| 2002/0125263 A1* | 9/2002 | Credle, Jr. | B62B 5/0026 |
| | | | 221/3 |
| 2004/0019406 A1* | 1/2004 | Wang | B25J 5/007 |
| | | | 700/231 |
| 2008/0100250 A1* | 5/2008 | Norman | A63H 11/00 |
| | | | 318/568.11 |
| 2010/0100241 A1* | 4/2010 | Jarisch | B25J 11/00 |
| | | | 700/259 |
| 2012/0152877 A1* | 6/2012 | Tadayon | B25J 5/02 |
| | | | 212/224 |
| 2014/0005832 A1 | 1/2014 | He et al. | |
| 2015/0112810 A1* | 4/2015 | Kim | G06Q 30/0269 |
| | | | 705/14.61 |
| 2015/0367513 A1* | 12/2015 | Gettings | G06Q 10/06 |
| | | | 700/248 |
| 2017/0011580 A1* | 1/2017 | Huang | G06Q 10/30 |
| 2017/0334063 A1* | 11/2017 | Komatsuzaki | B25J 9/0084 |
| 2018/0053369 A1* | 2/2018 | High | G01C 21/343 |
| 2018/0194006 A1 | 7/2018 | Gu et al. | |
| 2018/0257228 A1* | 9/2018 | Tingler | B25J 9/1669 |

OTHER PUBLICATIONS

Second Office Action, including Search Report, for Chinese Patent Application No. 201610809581.2, dated Jul. 18, 2019, 22 pages.

\* cited by examiner

US 10,600,272 B2

INTELLIGENT SCHEDULING SYSTEMS AND METHODS FOR VENDING ROBOTS

CROSS-REFERENCE TO RELATED APPLICATION(S)

The present application claims priority to the Chinese Patent Application No. 201610809581.2, filed on Sep. 8, 2016, entitled "INTELLIGENT SCHEDULING SYSTEMS AND METHODS FOR VENDING ROBOTS," which is incorporated herein by reference in its entirety.

TECHNICAL FIELD

The embodiments of the present application relate to vending robots, and more particularly, to an intelligent scheduling system and method for vending robots.

BACKGROUND

In scenic spots such as parks, squares etc., tourists often need to buy goods such as foods, drinks etc. Conventional fixed points of sales or vending machines are lack of intelligence, and a number of vending machines cannot be adjusted according to a population density and purchase needs of tourists in real time, which may result in conditions such as a serious queuing phenomenon and an insufficient supply in places where there is a large number of people, and may also result in conditions that goods cannot be sold etc. in places where there is a small number of people.

Thus, there is a need for an improved technical solution for selling goods in a scenic spot that can overcome the above-mentioned drawbacks in the prior art.

SUMMARY

According to an aspect of the present application, there is provided an intelligent scheduling system for vending robots, comprising: at least one video monitor, configured to acquire a population image of a plurality of regions and be capable of obtaining population density information of the plurality of regions by performing image processing on the population image; and a scheduling control server configured to allocate at least one vending robot to the plurality of regions according to the population density information of the plurality of regions and transmit, to the allocated at least one vending robot, a scheduling instruction which specifies a position of a region to which it is allocated, wherein the at least one vending robot is configured to autonomously move to the position of the region to which it is allocated for selling goods according to the scheduling instruction which specifies the position of the region from the scheduling control background server.

According to another aspect of the present application, there is provided an intelligent scheduling method for vending robots, comprising: receiving population density information of a plurality of regions which is obtained by performing image processing on a population image acquired by at least one video monitor from the plurality of regions; and allocating at least one vending robot to the plurality of regions according to the population density information of the plurality of regions and transmitting, to the allocated at least one vending robot, a scheduling instruction which specifies a position of a region to which it is allocated, wherein the at least one vending robot is configured to autonomously move to the position of the region to which it is allocated for selling goods according to the scheduling instruction which specifies the position of the region from the scheduling control background server.

DETAILED DESCRIPTION

Figure 1:
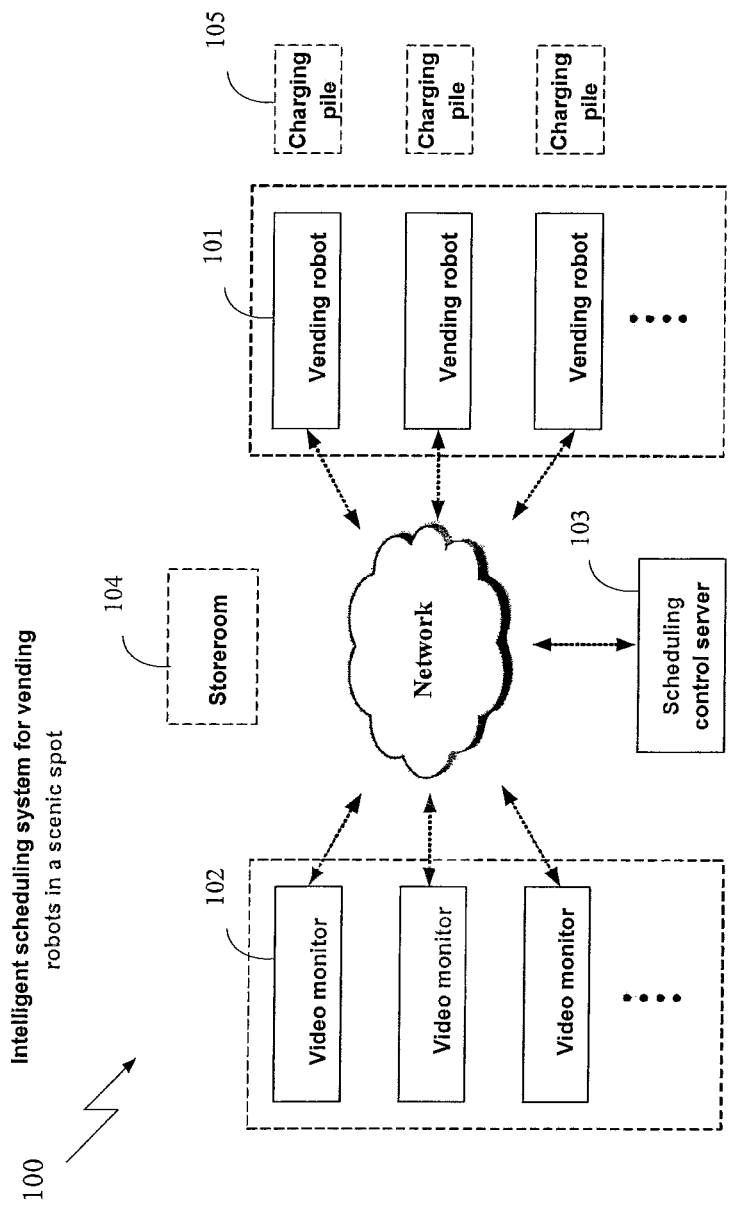
FIG. 1 illustrates an intelligent scheduling system for vending robots according to an embodiment of the present application.

In order to enable those skilled in the art to have a better understanding of the solutions according to the present application, the intelligent scheduling system and method for vending robots according to specific embodiments of the present application will be described in further detail below in conjunction with accompanying drawings. It is obvious that the described and illustrated embodiments and various specific features thereof are merely illustrative of the present application and are not intended to be limiting of the present application. All other embodiments and specific features thereof obtained by those skilled in the art based on the illustrative description without contributing any creative work are within the protection scope of the present application. Now referring to FIG. 1, illustrated is an intelligent scheduling system 100 for vending robots according to an embodiment of the present application. As shown in FIG. 1, the intelligent scheduling system 100 for vending robots may comprise at least one vending robot 101, at least one video monitor 102 and a scheduling control server 103.

The at least one vending robot 101, the at least one video monitor 102 and the scheduling control server 103 may communicate with each other over a network. The network may be any network, such as the Internet, a telecommunication network, an intranet, a local area network etc., or a combination of multiple networks. The communication may be wired communication, wireless communication, or a combination thereof. In some embodiments, the vending robot 101 may communicate wirelessly with the scheduling control server 103 over a network.

Figure 2:
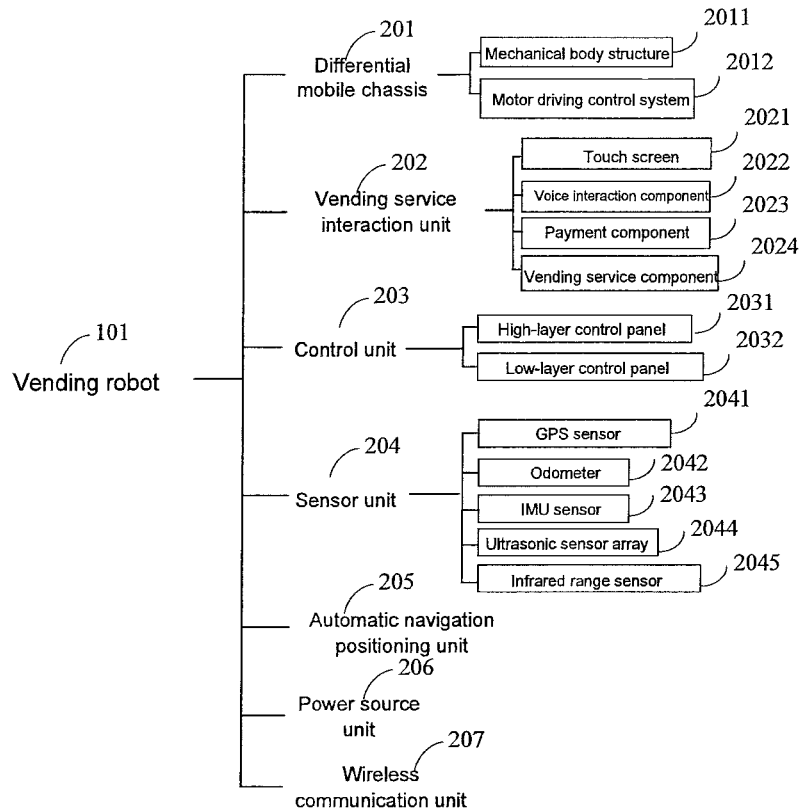
FIG. 2 illustrates a constitutional structural diagram of a vending robot which may be used in an embodiment of the present application.

The vending robot 101 may be any existing vending robot or a vending robot which will be developed in the future. FIG. 2 illustrates a constitutional structural diagram of the vending robot 101 which may be used in an embodiment of the present application.

As shown in FIG. 2, the vending robot may comprise a differential mobile chassis 201, a vending service interaction unit 202, a control unit 203, a sensor unit 204, an automatic navigation positioning unit 205, a power source unit 206, and a wireless communication unit 207. The differential mobile chassis 201 may comprise a mechanical body structure 2011 and a motor driving control system 2012; the vending service interaction unit 202 may comprise a touch screen 2021, a voice interaction component 2022, a payment component 2023, and a vending service component 2024; the control unit 203 may comprise a high-layer control panel 2031 and a low-layer control panel 2032, wherein the high-layer control panel 2031 may be responsible for upper-layer motion planning and control of a robot, and the low-layer control panel 2032 may be responsible for motion control of local autonomous obstacle avoidance and automatic charging; the sensor unit 204 may comprise a GPS sensor 2041, an odometer 2042, an Inertial Measurement Unit (IMU) sensor 2043, an ultrasonic sensor array 2044, an infrared range sensor 2045 etc.; the automatic navigation positioning unit 205 may integrate data information of the GPS sensor 2041, the odometer 2042 and the IMU sensor 2043 based on a Kalman filtering algorithm for real-time positioning of a robot; the power source unit 206 may be a rechargeable power source unit and may be used to provide power to a vending robot; and the wireless communication unit 207 may be used for the vending robot 101 and the scheduling control server 103, and is optionally used for communication with a shopping application on a mobile device of a user.

A structural constitution of the vending robot described above is only an example, and is not intended to limit the vending robot which may be used in the present application. As the vending robot can be implemented by an existing vending robot, it will not be described in detail here.

Figure 3:
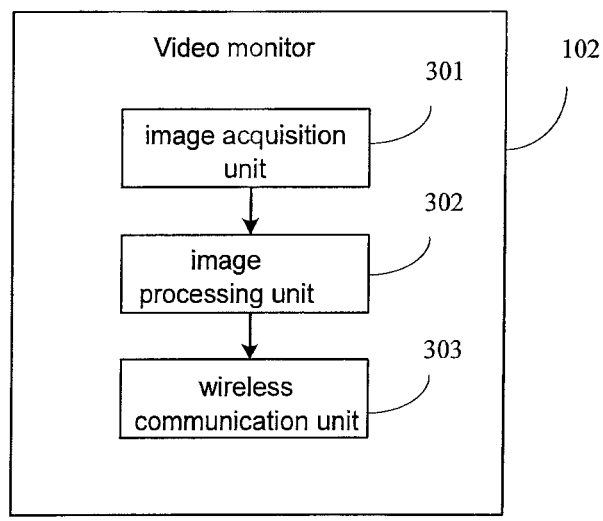
FIG. 3 illustrates a constitutional structural diagram of a video monitor 102 which may be used in an embodiment of the present application.

The video monitor 102 may be any existing video monitor or a video monitor which will be developed in the future. There may be many video monitors 102, which are arranged, for example, in a plurality of regions of a scenic spot respectively. FIG. 3 illustrates a constitutional structural diagram of the video monitor 102 which may be used in an embodiment of the present application.

As shown in FIG. 3, the video monitor 102 may comprise an image acquisition unit (i.e., a monitor camera) 301, an image processing unit 302 and a wireless communication unit 303. The image acquisition unit 301 may be used to acquire a population image of a region in which it is located. The image processing unit 302 may be used to perform image processing on the acquired population image of the region, for example based on pixel statistics and texture features, to obtain real-time population density information. The wireless communication unit 303 may be used for wireless communication between the video monitor 102 and other devices, for example, for transmitting the population density information to the scheduling control server 103.

In some embodiments, the image processing unit 302 may also transmit only the population image acquired by the image acquisition unit 301 to the scheduling control server 103 or other computing devices on the network through the wireless communication unit 303, and the population image is processed by the scheduling control server 103 or other computing devices to obtain real-time population density information.

The scheduling control server 103 may be implemented by a combination of computer hardware and software, for example, a combination of general purpose computer hardware and software programs such as a processor, a memory, an input/output device, etc. The software programs may be stored in the memory and is loaded and executed by the processor to implement various operations of the intelligent scheduling system 100 for vending robots according to an embodiment of the present application, for example, form a scheduling scheme for allocating vending robots to a plurality of regions in various scenic spots according to population density information from the video monitor, transmit scheduling instructions for moving to corresponding regions to corresponding vending robots according to the scheduling schedule, receive sale order information, abnormality or shortage messages and an electric quantity insufficiency message from vending robots in various regions, and form an adjusted scheduling scheme according to new population density information and/or sale order information, etc., and transmit instructions for moving to corresponding regions to corresponding vending robots according to the adjusted scheduling scheme etc.

In some embodiments, the intelligent scheduling system 100 for vending robots may further comprise a storeroom 104 and/or at least one charging pile 105. The storeroom 104 is used to store goods for sale and load and supply the goods for sale to the vending robot 101. The charging pile 105 is used to charge the vending robot 101.

In some embodiments, the intelligent scheduling system 100 for vending robots may further comprise an application (APP) which may be installed on a mobile device of a user. The application may, for example, be stored on a common application platform, so that any tourist can download the application to a mobile device thereof and install and use the application. The application, after downloaded and installed on a mobile device of a user, can be connected to a vending robot through a wireless network and the user can query a position of the vending robot and information of goods sold by the vending robot and place an order through the application.

In some embodiments, the intelligent scheduling system 100 for vending robots may divide a scenic spot into a number of regions, which may be numbered with $i=1,2,\ldots,n$ (where n is an integer greater than or equal to 1), and N (N is an integer greater than or equal to 1) robots may be reasonably distributed into various regions of the scenic spot according to the scheduling scheme. In addition, there may also be M (M is an integer greater than or equal to 0) standby vending robots left in the storeroom, so that when the N robots cannot meet scheduling requirements, the M standby vending robots can offer support.

The scheduling control server 103 may monitor a population density, goods purchase demands of a population, and states of the vending robots in the scenic spot in real time according to the population image or population density information from the video monitor 102 and the goods purchase demand information and other state information from various vending robots 101, and perform real-time state switching control on each vending robot based on the finite state machine principle, i.e., defining different states of various vending robots in operation processes, switching each vending robot between different states, and enabling intelligent scheduling of a plurality of vending robots through the state switching.

Figure 4:
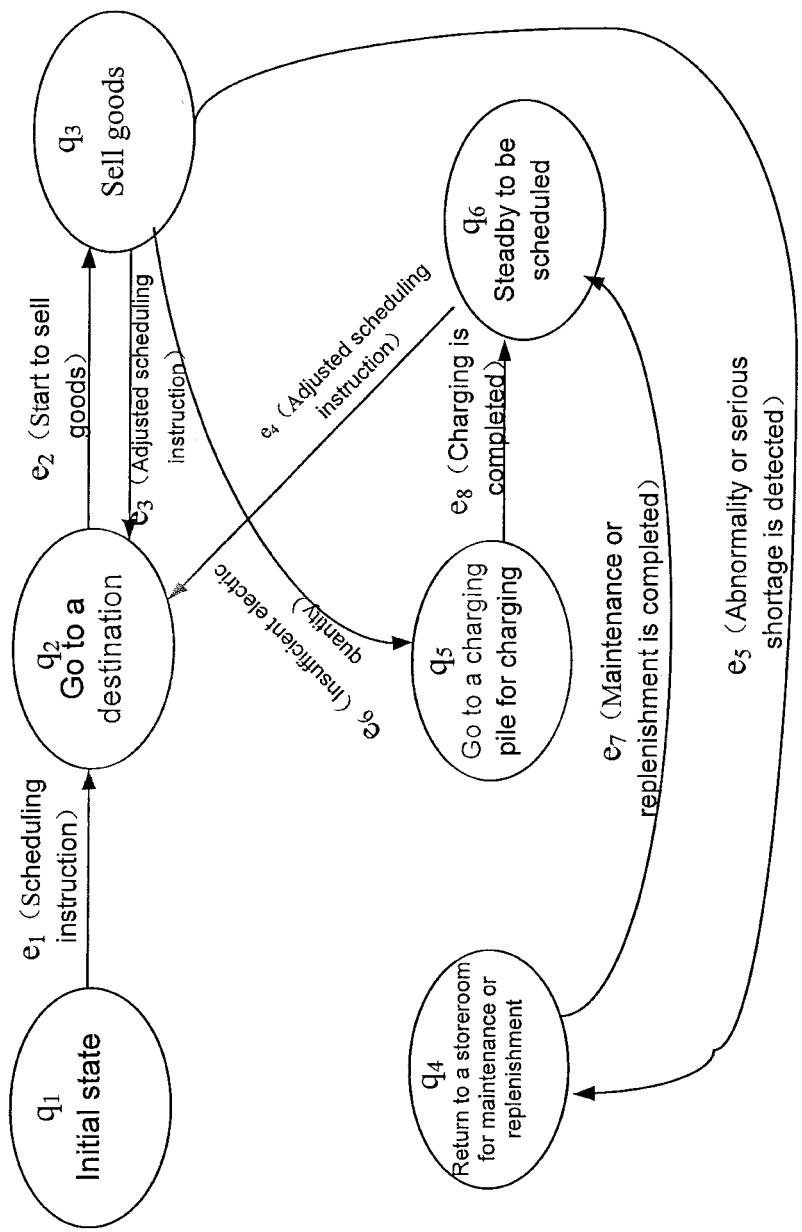
FIG. 4 illustrates a diagram of a finite state machine model used by an intelligent scheduling system for vending robots to implement intelligent scheduling of a plurality of vending robots according to an embodiment of the present application.

Now referring to FIG. 4, illustrated is a diagram of a finite state machine model used by the intelligent scheduling system 100 for vending robots to implement a plurality of vending robots according to an embodiment of the present application. As shown in FIG. 4, the finite state machine may be expressed as $M=(E, Q, \delta)$, where $Q=\{q_1, q_2, \ldots, q_6\}$ represents a finite set of discrete states of a vending robot, $E=\{e_1, e_2, \ldots, e_8\}$ represents a finite set of control instructions of the intelligent scheduling system 100 for vending robots, and $\delta$ represents mapping from one state to another. Six operation states are set for each of the vending robots 101, which are an initial state $q_1$, a state $q_2$ in which the vending robot 101 goes to a destination, a state $q_3$ in which goods are sold, a state $q_4$ in which the vending robot 101 returns to a storeroom for maintenance or replenishment, a state $q_5$ in which the vending robot 101 goes to a charging pile for charging, and a state $q_6$ in which after the vending robot 101 completes returning to the storeroom for maintenance or replenishment or the charging is completed, the vending robot 101 waits to be scheduled as a standby vending robot.

In an initial phase, the scheduling control server 103 issues a scheduling instruction to specify a target region for each vending robot 101 $e_1$; the vending robot 101 stops moving and starts selling goods after arriving at a position of the target region $e_2$ ; when an adjusted scheduling instruction is received by a vending robot 101 which is selling goods, the vending robot 101 stops receiving a new sale order, completes a sale task which is currently received and then goes to a specified target region $e_3$; when a standby vending robot 101 receives an adjusted scheduling instruction, the standby vending robot 101 goes to a specified target region $e_4$; when the vending robot 101 detects an abnormality or serious shortage state, it needs to return to a storeroom for maintenance and replenishment $e_5$; when an electric quantity of the vending robot 101 is insufficient, it needs to autonomously go to a nearby charging pile for charging $e_6$; the vending robot 101 completes returning to the storeroom for maintenance or replenishment $e_7$; and the charging is completed $e_8$. As described above, state transitions of the vending robot are as follows:

$$\delta(q_1, e_1)=q_2, \delta(q_2, e_2)=q_3, \delta(q_3, e_3)=q_2, \delta(q_6, e_4)=q_2,$$
$$\delta(q_3, e_5)=q_4, \delta(q_4, e_7)=q_6, \delta(q_3, e_6)=q_5, \text{ and}$$
$$\delta(q_5, e_8)=q_6.$$

It should be noted that the finite state machine model described and illustrated above is merely an illustrative description of a finite state machine model which may be used by the intelligent scheduling system 100 for vending robots according to an embodiment of the present application, and are not intended to be limiting thereof. In other embodiments of the present application, the intelligent scheduling system 100 for vending robots may use other finite state machine models, or does not use any finite state machine model.

Figure 5:
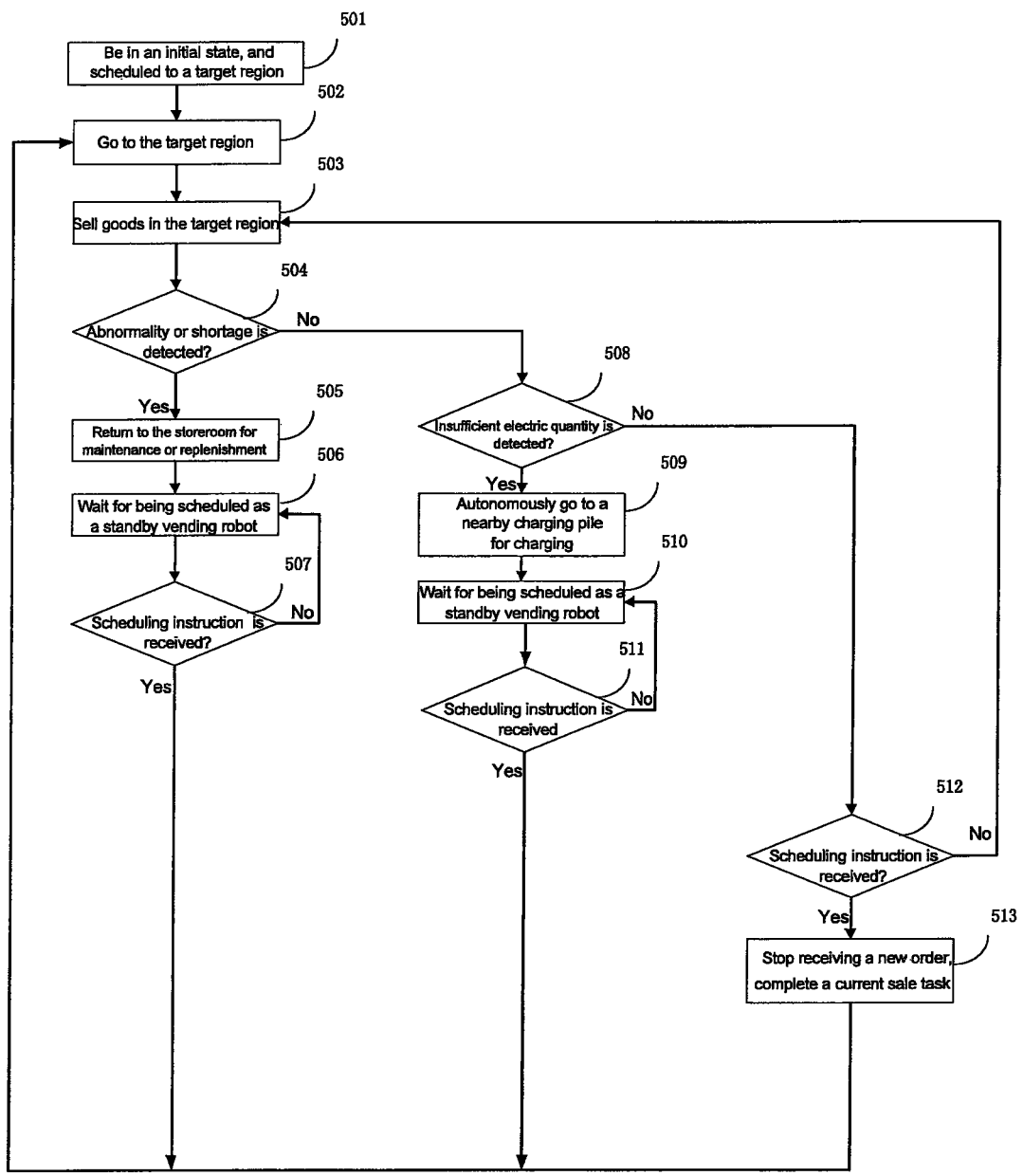
FIG. 5 illustrates a flowchart of operations and state transitions of a vending robot according to an embodiment of the present application.

Now referring to FIG. 5, illustrated is a flowchart of operations and state transitions of a vending robot according to an embodiment of the present application, which illustrates various states of the vending robot and transitions thereof in a flowchart form.

As shown in FIG. 5, in step 501, the vending robot 101 is in an initial state (at this time, for example, preparation operations such as charging, loading goods for sale etc. may be performed). The scheduling control server 103 may form an initial scheduling scheme using the method described below to allocate the vending robot 101 to a target region and transmit a scheduling instruction for moving to the target region to the vending robot 101.

In step 502, the vending robot 101 goes to the target region.

In step 503, the vending robot 101 sells goods in the target region.

In step 504, the vending robot 101 may judge whether abnormality or stock out is detected. The vending robot 101 may detect abnormality or shortage through a detection device such as a corresponding sensor therein, and may transmit an abnormality or shortage message to the scheduling control server 103 when it is judged that abnormality or shortage is detected. After receiving the abnormality or shortage message, the scheduling control server 103 may record the abnormality or shortage message and the vending robot 101 which transmits the message, and may transmit an instruction for returning to a storeroom for maintenance or replenishment to the vending robot 101.

Therefore, in response to the judgment in step 504 being yes, the process proceeds to step 505, and in response to the judgment in step 504 being no, the process proceeds to step 508.

In step 505, the vending robot 101 autonomously returns to the storeroom for maintenance or replenishment.

After the maintenance or replenishment is completed, the vending robot 101 may transmit a maintenance or replenishment completion message to the scheduling control server 103, so that the scheduling control server 103 may use the vending robot to participate in a next scheduling as a standby vending robot.

Thus, in step 506, the vending robot 101 may wait for a next scheduling as a standby vending robot.

In step 507, the vending robot 101 may judge whether a scheduling instruction from the scheduling control server 103 is received. In response to the judgment being yes, the process proceeds to step 502 in which the vending robot 101 autonomously goes to a target region specified by the scheduling instruction. In response to the judgment being no, the vending robot 101 returns to step 506 and continues to wait for a next scheduling.

In step 508, the vending robot 101 may judge whether insufficient electric quantity is detected. If insufficient electric quantity is detected, the vending robot 101 may transmit an electric quantity insufficiency message to the scheduling control server 103. After receiving the electric quantity insufficiency message, the scheduling control server 103 may record the message and the vending robot 101 which transmits the message, and may transmit an instruction for going to a nearby charging pile for charging the vending robot 101.

Therefore, in response to the judgment in step 508 being yes, the process proceeds to step 509; and in response to the judgment in step 508 being no, the process proceeds to step 512.

In step 509, the vending robot 101 may autonomously go to a nearby charging pile for charging.

After charging is completed, the vending robot 101 may transmit a charging completion message to the scheduling control server 103. After receiving the charging completion message, the scheduling control server 103 may use the vending robot 101 to participate in a next scheduling as a standby vending robot.

Thus, in step 510, the vending robot 101 may wait for a next scheduling as a standby vending robot.

In step 511, the vending robot 101 may judge whether a scheduling instruction is received. In response to the judgment being yes, the process proceeds to step 502 in which the vending robot 101 autonomously goes to a target region specified by the scheduling instruction. In response to the judgment being no, the process proceeds to step 512.

In step 512, the vending robot 101 may judge whether a scheduling instruction from the scheduling control server 103 is received.

The scheduling instructions received in step 512 and steps 507 and 511 may be a scheduling instruction transmitted to a corresponding vending robot 101 according to an adjusted scheduling scheme which is formed periodically by the scheduling control server 103 according to a new monitored population density, goods sale volume, and states of various vending robots in a goods sale phase. A specific method for forming the adjusted scheduling scheme by the scheduling control server 103 can be described in the following description.

In response to the judgment in step 512 being yes, the process proceeds to step 513, and in response to the judgment in step 512 being no, the process returns to step 503 to continue to sell goods in the original region.

In step 513, after receiving the scheduling instruction, the vending robot 101 may stop receiving a new order, complete a current sale task (if any), and go to a new target region specified by the scheduling instruction.

A flow of the operations and state transitions of the vending robot used in the intelligent scheduling system 100 for vending robots according to an embodiment of the present application have been described above with reference to the accompanying drawings, and it should be noted that the above description and illustration are merely examples and are not intended to limit the present application. In other embodiments of the present application, the intelligent scheduling system 100 for vending robots may use flows of operations and state transitions of other vending robots.

The method for forming a scheduling scheme for allocating vending robots to a plurality of regions in a scenic spot by the intelligent scheduling system 100 for vending robots in an initial phase according to an embodiment of the present application will be described below.

1) First of all, the entire scenic spot may be divided into n regions which are numbered with i=1,2, . . . , n respectively in combination with characteristics of the scenic spot. The scenic spot may be manually divided in advance and the divided regions are input to the scheduling control server 103.

2) A population image can be acquired at a certain frequency by a monitor camera of a video monitor 102 in a region i of the scenic spot, image processing may be performed on the acquired population image by the video monitor 102 or the scheduling control server 103, and a real-time population density estimation value $\rho_{1i}$ is obtained based on pixel statistics and texture features.

3) Historical data of a population density of the region i of the scenic spot, for example, population densities in periods of time in this quarter in previous several years with the same characteristics (for example, 10 a.m. per Saturday), may be extracted by the scheduling control server 103, and an average value of the extracted population density values is taken as the population density historical estimation value $\rho_{2i}$ in the region i in this period of time. The historical data of the population density may be obtained by performing image processing on population images which are previously acquired by the video monitor 102.

4) A real-time number $N_i$ of APP orders of users may be counted by the scheduling control server 103. In an initial phase, a tourist in the scenic spot may be allowed to order goods which are sold in various regions of the scenic spot through a corresponding APP on a mobile device thereof, thereby forming an order for a particular region of the scenic spot. Alternatively, in the initial phase, the tourist in the scenic spot may also not be allowed to order goods, and therefore the number $N_i$ of orders is zero. Of course, historical data of numbers of orders in various regions of the scenic spot may also be considered to be used as alternatives.

5) A demand evaluation function $K_i = m_{1i}\rho_{1i} + m_{2i}\rho_{2i} + m_{3i}N_i$ may be established by the scheduling control server 103, where $m_{1i}$, $m_{2i}$ and $m_{3i}$ are corresponding weighting coefficients. Based on a distribution of evaluation function values $K_i$ of various regions in the scenic spot, the scheduling control server 103 may allocate N robots to be allocated to various target regions in proportion, that is, a number of vending robots 101 allocated to the region i is a rounding value of $$\frac{K_i}{\sum_{i=1}^{n} K_i} N.$$

6) Thus, the scheduling control server may transmit, to the respective allocated vending robots 101, scheduling instructions which specify a corresponding target region to which it is allocated. After receiving the scheduling instruction, the vending robot 101 may autonomously go to a corresponding specified target region, and stop moving and start selling goods after arriving at the target region. In addition, before or after receiving the scheduling instruction, the vending robot 101 may firstly load goods for sale and may perform other preparation operations such as charging etc.

7) In some other embodiments, various regions in the scenic spot may be further divided into different attribute categories, such as a children's play area, a special scenic spot area, a rest area etc. After receiving the scheduling instruction, the vending robot 101 may firstly be loaded with goods suitable for an attribute category of a region to which it is allocated, for example, a vending robot 101 in a target region which is a children's play area is mainly loaded with goods such as children's toys etc., a vending robot 101 in a target region which is a special scenic spot area is mainly loaded with goods such as scenic souvenirs etc., a vending robot 101 in a target region which is a rest area is mainly loaded with goods such as drinks, snacks etc.

The method for forming a scheduling scheme for allocating vending robots to a plurality of region of a scenic spot by the intelligent scheduling system 100 for vending robots in an initial phase has been described above, and a method for forming an adjusted scheduling scheme for re-allocating vending robots to a plurality of region of a scenic spot by the intelligent scheduling system 100 for vending robots in a goods sale phase according to some other embodiments of the present application will be described below. In some other embodiments of the present application, the vending robot 100 may also not form an adjusted scheduling scheme in the goods sale phase, but use the initial scheduling scheme all the same.

With a change in population densities and goods purchase demands of tourists in various regions of the scenic spot, there are some regions to which additional vending robots 101 need to be allocated and some regions in which there are vending robots 101 in an idle state. Therefore, the scheduling control server 103 may adjust a distribution of numbers of vending robots 101 once at each interval $\Delta t$, where adjusting the distribution comprises selecting vending robots for supplying support from all standby vending robots 101 (comprising standby vending robots which are not allocated in the initial phase and allocated vending robots which are used as standby vending robots after being maintained or replenished or charged) and vending robots in specific regions which are in an idle state for regions to which additional vending robots need to be allocated.

It should be noted that the scheduling control server 103 here may use the same method as the method for forming a scheduling scheme for allocating vending robots to a plurality of regions in an initial stage described above to determine regions to which additional vending robots need to be allocated and regions in which there are vending robots in an idle state.

A method for selecting intelligent vending robots for offering support by the scheduling control server 103 for a region to which additional vending robots need be allocated may be described below.

For vending robots in some regions which are in an idle state, an energy consumption cost estimation function and a time cost estimation function are established based on a time estimate required by each of the vending robots to complete current sale orders and a movement time estimate required by the vending robot to move to a new target region (if replenishment is required, a sum of movement time for returning to a storeroom, replenishment time, and movement time required for moving from the storeroom to a new target region is required to be calculated); for standby vending robots located in a storeroom, an energy consumption cost estimation function and a time cost estimation function are established based on a movement time estimate required by each of the standby vending robots to move to a target region and a replenishment time estimate of the standby vending robot; and for standby vending robots located in charging piles, an energy consumption cost estimation function and a time cost estimation function are established based on a movement time estimate required by each of the standby vending robots to move to a new target region (if replenishment is required, a sum of movement time for returning to a storeroom, replenishment time, and movement time required for moving from the storeroom to a new target region is required to be calculated). Based on the energy consumption cost estimates and time cost estimates of the above vending robots, vending robots which cannot meet an energy consumption condition are excluded, time prediction and arbitration are finally performed to evaluate all the robots which may be scheduled, and a robot which has a minimum time cost is selected therefrom. A specific implementation may be as follows.

Assume that $t_{i1}$ is an estimated goods sale time cost for a vending robot i to complete a current order, and a corresponding estimated energy consumption cost value is $E_{i1}$. $t_{i2}$ is an estimated movement time cost for the vending robot to arrive at a target region. For example, a static path planning method based on an A* algorithm may be used. Because of a large number of tourists in a scenic spot, detected population movement characteristics may be taken into account for selection of a moving speed of a vending robot. A population movement speed may be obtained using a video analysis method based on an optical flow method, and the movement time cost $t_{i2}$ for the vending robot to arrive at the target region and an energy consumption cost $E_{i2}$ caused by the movement are estimated in combination with a planned optimal path. $t_{i3}$ is cost time which is estimated when the robot judges that it needs to return to a storeroom for replenishment, which is comprised of path planning time and replenishment time, and an estimated energy consumption cost is $E_{i3}$.

Firstly, an energy consumption cost estimate function $E_i$ for each of standby vending robots and idle vending robots may be calculated as follows:

$$E_i = E_{i1} + E_{i2} + E_{i3}$$

Then, a vending robot with a minimum time cost estimation function $f_i$ is selected from robots which meet an energy consumption cost condition $E_i \leq \epsilon_r E_{ir}$ as a vending robot which will go to a new target region for offering support, where $E_{ir}$ is a remaining energy value for the robot, and $\epsilon_r$ is a safety proportional coefficient. The time cost estimation function for scheduling is defined as:

$$f_i = w_1 t_{i1} + w_2 t_{i2} + w_3 t_{i3}$$

where $w_1$, $w_2$ and $w_3$ are corresponding adjustment parameters. When it is judged that the vending robot needs not to return to the storeroom, the coefficient $w_3$ is 0.

The intelligent scheduling system for vending robots according to the embodiments of the present application, the components thereof, the finite state machine model used by the intelligent scheduling system for vending robots to implement intelligent scheduling of a plurality of vending robots, the flows of operations and state transitions of a vending robot, the method for forming a scheduling scheme by the intelligent scheduling system for vending robots in an initial phase and the method for forming an adjusted scheduling scheme in a goods sale phase have been described above. It should be noted that numerous details and features in the above description are only examples, and are not intended to be limiting of the present application. In general, as described below, specific embodiments of the present application comprise only some of the features described above.

According to the embodiments of the present application, an intelligent scheduling system 100 for vending robots comprises:

at least one video monitor 102, configured to acquire a population image of a plurality of regions in a scenic spot and be capable of obtaining population density information of the plurality of regions by performing image processing on the population image; and a scheduling control server 103 configured to allocate at least one vending robot 101 to the plurality of regions according to the population density information of the plurality of regions, for example, the scheduling control server 103 may allocate more vending robots 101 to a region with a large population density, and transmit, to each of the allocated vending robots, a scheduling instruction which specifies a position of a region to which it is allocated, wherein the at least one vending robot 101 is configured to autonomously move to the position of the region to which it is allocated for selling goods according to the scheduling instruction which specifies the position of the region from the scheduling control server 103.

In this way, it is possible to automatically allocate different numbers of vending robots according to population densities at different places in the scenic spot, which enhances the supply volume in the crowded region, thereby better satisfying the goods purchase demands of the tourists.

According to some embodiments of the present application, the scheduling control server 103 is further configured to:

acquire sale volume information of the plurality of regions and allocate vending robots 101 to the plurality of regions according to the sale volume information.

In this way, it is possible to automatically allocate and adjust numbers of vending robots according to sale volumes at different places in the scenic spot, thereby better satisfying the goods purchase demands of the tourists.

According to some embodiments of the present application, the scheduling control server 103 is further configured to:

calculate a demand evaluation function for each of the plurality of regions:

$$K\_i = m\_1i\ \rho\_1i + m\_2i\ \rho\_2i + m\_3i\ N\_i,$$

wherein K_i represents a demand evaluation function for an ith region, $\rho\_1i$ represents a real-time population density for the ith region, $\rho\_2i$ represents a historical estimation value of a population density for the ith region, N_i represents a real-time sale order volume for the ith region, and m_1i, m_2i and m_3i represent corresponding weighting coefficients; and allocate a corresponding number of vending robots to each region according to a value of the demand evaluation function for the corresponding region.

In this way, by calculating the demand evaluation function in consideration of the real-time population density, the historical estimation value of the population density and the real-time sale order volume, it is possible to better predict the population densities of various regions in the future, thereby better satisfying the goods purchase demands of the tourists.

According to some embodiments of the present application, the vending robot 101 is further configured to detect whether there is abnormity or shortage and transmit an abnormity or shortage message to the scheduling control server when it is detected that there is abnormity or shortage, and the scheduling control server 103 is further configured to transmit an instruction for returning to a storeroom for maintenance or replenishment to a vending robot with abnormity or shortage in response to receiving the abnormity or shortage message.

According to some embodiments of the present application, the intelligent scheduling system 100 for vending robots further comprises at least one charging pile 105, and the vending robot 101 is further configured to detect whether an electric quantity is sufficient, and transmit an electric quantity insufficiency message to the scheduling control server 103 when it is detected that the electric quantity is sufficient, and the scheduling control server 103 is further configured to transmit an instruction for moving to a charging pile for charging a vending robot with insufficient electric quantity in response to receiving the electric quantity insufficiency message.

According to some embodiments of the present application, the scheduling control server 103 is further configured to:

periodically adjust allocation of vending robots to the plurality of regions according to current population density information and/or sale volume information of each region.

In this way, it is possible to timely adjust allocation of numbers of vending robots in different regions according to changes in population densities and purchase volumes in different regions, thereby more timely and better satisfying the goods purchase demands of the tourists.

According to further embodiments of the present application, the scheduling control server 103 is further configured to:

for each region to which a vending robot needs to be allocated according to the adjustment, calculate an energy consumption cost estimation value and a time cost estimation value of each of the vending robots according to corresponding one or more of a time estimate required by each of the vending robots to complete current sale orders, a time estimate required by each of the vending robots to move to the region, a time estimate required by each of the vending robots to move to a storeroom and a time estimate required by each of the vending robots for replenishment;

select a vending robot with a minimum time cost estimation value from vending robots with remaining energy greater than the energy consumption cost estimation value; and transmit a scheduling instruction which specifies a position of the region to the selected vending robot.

In this way, by calculating the energy consumption cost estimation values and the time cost estimation values of the relevant vending robots and selecting vending robots for supplying support based on the energy consumption cost estimation values and the time cost estimation values, it is more advantageous and more convenient to adjust the allocation of the vending robots, thereby more timely and better satisfying the goods purchase needs of the tourists.

According to some embodiments of the present application, the intelligent scheduling system 100 for vending robots further comprises: an application which can be installed on a mobile device of a user, wherein the application is connectable to a vending robot via a wireless network, and the user can query a position of the vending robot and information of goods sold by the vending robot and place an order through the application.

In this way, a tourist in the scenic spot can more convenient to query information of nearby goods through an application on a mobile device thereof, thereby more conveniently satisfying the goods purchase demands.

In another aspect of the present application, there is also provided an intelligent scheduling method for vending robots. The method may be performed by the intelligent scheduling system for vending robots described above according to the embodiments of the present application, and therefore various steps of the method correspond to the operations of various components of the system. For the sake of brevity, a part of repeated details in the above description are omitted from the following description, and therefore, a more detailed understanding of the method can be obtained with reference to the above description.

According to the embodiments of the present application, the intelligent scheduling method for vending robots comprises the following steps:

receiving population density information of a plurality of regions which is obtained by performing image processing on a population image acquired by at least one video monitor from the plurality of regions; and allocating the vending robots to the plurality of regions according to the population density information of the plurality of regions and transmitting, to each of the allocated vending robots, a scheduling instruction which specifies a position of a region to which it is allocated, wherein the vending robot is configured to autonomously move to the position of the region for selling goods according to the scheduling instruction which specifies the position of the region from the scheduling control background server.

According to some embodiments of the present application, the method further comprises the following step:

allocating the vending robots to the plurality of regions according to sale volume information of the plurality of regions from the vending robots.

According to some embodiments of the present application, the method further comprises the following step:

calculating a demand evaluation function for each of the plurality of regions:

$$K\_i = m\_1i\ \rho\_1i + m\_2i\ \rho\_2i + m\_3i\ N\_i,$$

wherein K_i represents a demand evaluation function for an ith region, $\rho\_1i$ represents a real-time population density for the ith region, $\rho\_2i$ represents a historical estimation value of a population density for the ith region, N_i represents a real-time sale order volume for the ith region, and m_1i, m_2i and m_3i represent corresponding weighting coefficients; and allocating a corresponding number of vending robots to each region according to a value of the demand evaluation function for the corresponding region.

According to some embodiments of the present application, the method further comprises the following step:

transmitting an instruction for returning to a storeroom for maintenance or replenishment to a vending robot with abnormity or shortage in response to receiving an abnormity or shortage message from the vending robot.

According to some embodiments of the present application, the method further comprises the following step:

transmitting an instruction for moving to a charging pile for charging a vending robot with insufficient electric quantity in response to receiving an electric quantity insufficiency message from the vending robot.

According to some embodiments of the present application, the method further comprises the following steps:

periodically adjusting allocation of vending robots to the plurality of regions according to current population density information and/or sale volume information of each region; and for each region to which a vending robot needs to be allocated according to the adjustment, calculating an energy consumption cost estimation value and a time cost estimation value of each of the vending robots according to corresponding one or more of a time estimate required by each of the vending robots to complete current sale orders, a time estimate required by each of the vending robots to move to the region, a time estimate required by each of the vending robots to move to a storeroom and a time estimate required by each of the vending robots for replenishment;

selecting a vending robot with a minimum time cost estimation value from vending robots with remaining energy greater than the energy consumption cost estimation value; and transmitting a scheduling instruction which specifies a position of the region to the selected vending robot.

According to some embodiments of the present application, the method further comprises the following step:

allowing an application which is installed on a mobile device of a user to be connected to a vending robot via a wireless network, and allowing the user to query a position of the vending robot and information of goods sold by the vending robot and place an order through the application.

The intelligent scheduling of the vending robots according to the embodiments of the invention realizes intelligent allocation and scheduling of tasks of a plurality of vending robots, and enhances the supply volume and the satisfaction of the tourists at places where there is a large amount of goods purchase demands.

The intelligent scheduling method for vending robots according to the embodiments of the present application has been described above, and it should be noted that the above description is an example only and is not intended to be limiting of the present application. In other embodiments of the present application, the method may have more, fewer or different steps, and relationships such as the order, inclusion, function, etc. among the steps may be different from those described.

It is to be understood that the above embodiments of the present application are merely exemplary embodiments for the purpose of illustrating the principles of the present application, and the present application is not limited thereto. It will be apparent to those skilled in the art that various variations and improvements can be made therein without departing from the spirit and substance of the present application, which are also intended to be within the protection scope of the present application. The protection scope of the present application is defined only by the meaning of the language expression of the appended claims and their equivalents.

We claim:

1. An intelligent scheduling system for vending robots, comprising:

at least one video monitor, configured to acquire a population image of a plurality of regions and obtain population density information of the plurality of regions by performing image processing on the population image; and a scheduling control server configured to allocate at least one vending robot to the plurality of regions according to the population density information of the plurality of regions, and transmit, to the allocated at least one vending robot, a scheduling instruction which specifies a position of a region to which it is allocated, wherein the at least one vending robot is configured to autonomously move to the position of the region to which it is allocated for selling goods according to the scheduling instruction which specifies the position of the region from the scheduling control background server, wherein the scheduling control server is further configured to:

periodically adjust allocation of vending robots to the plurality of regions according to current population density information and/or sale volume information of each region, wherein the scheduling control server is further configured to:

for each region to which a vending robot needs to be allocated according to the adjustment, calculate an energy consumption cost estimation value and a time cost estimation value of each of the vending robots according to corresponding one or more of a time estimate required by each of the vending robots to complete current sale orders, a time estimate required by each of the vending robots to move to the region, a time estimate required by each of the vending robots to move to a storeroom and a time estimate required by each of the vending robots for replenishment;

select a vending robot with a minimum time cost estimation value from vending robots with remaining energy greater than the energy consumption cost estimation value; and transmit a scheduling instruction which specifies a position of the region to the selected vending robot.

2. The system according to claim 1, wherein the scheduling control server is further configured to:

obtain sale volume information of the plurality of regions and allocate at least one vending robot to the plurality of regions according to the sale volume information.

3. The system according to claim 1, wherein the scheduling control server is further configured to:

calculate a demand evaluation function for each of the plurality of regions:

$$K_i = m_{1i}\rho_{1i} + m_{2i}\rho_{2i} + m_{3i}N_i,$$

wherein $K_i$ represents a demand evaluation function for an $i^{th}$ region, $\rho_{1i}$ represents a real-time population density for the $i^{th}$ region, $\rho_{2i}$ represents a historical estimation value of a population density for the $i^{th}$ region, $N_i$ represents a real-time sale order volume for the $i^{th}$ region, and $m_{1i}$, $m_{2i}$ and $m_{3i}$ represent corresponding weighting coefficients; and allocate a corresponding number of vending robots to each region according to a value of the demand evaluation function for the corresponding region.

4. The system according to claim 1, wherein the vending robot is further configured to detect whether there is abnormity or shortage and transmit an abnormity or shortage message to the scheduling control server when it is detected that there is abnormity or shortage, and the scheduling control server is further configured to transmit an instruction for returning to a storeroom for maintenance or replenishment to a vending robot with abnormity or shortage in response to receiving the abnormity or shortage message.

5. The system according to claim 1, further comprising at least one charging pile, and the vending robot is further configured to detect whether an electric quantity is sufficient, and transmit an electric quantity insufficiency message to the scheduling control server when it is detected that the electric quantity is sufficient, and the scheduling control server is further configured to transmit an instruction for moving to a charging pile for charging a vending robot with insufficient electric quantity in response to receiving the electric quantity insufficiency message.

6. The system according to claim 1, further comprising: an application which can be installed on a mobile device of a user, wherein the application is connectable to a vending robot via a wireless network, and the user can query a position of the vending robot and information of goods sold by the vending robot and place an order through the application.

7. An intelligent scheduling method for vending robots, comprising:

receiving population density information of a plurality of regions which is obtained by performing image processing on a population image acquired by at least one video monitor from the plurality of regions; and allocating at least one vending robot to the plurality of regions according to the population density information of the plurality of regions and transmitting, to the allocated at least one vending robot, a scheduling instruction which specifies a position of a region to which it is allocated, wherein the at least one vending robot is configured to autonomously move to the position of the region to which it is allocated for selling goods according to the scheduling instruction which specifies the position of the region from the scheduling control background server, further comprising:

periodically adjusting allocation of vending robots to the plurality of regions according to current population density information and/or sale volume information of each region, further comprising:

for each region to which a vending robot needs to be allocated according to the adjustment, calculating an energy consumption cost estimation value and a time cost estimation value of each of the vending robots according to corresponding one or more of a time estimate required by each of the vending robots to complete current sale orders, a time estimate required by each of the vending robots to move to the region, a time estimate required by each of the vending robots to move to a storeroom and a time estimate required by each of the vending robots for replenishment;

selecting a vending robot with a minimum time cost estimation value from vending, robots with remaining energy greater than the energy consumption cost estimation value; and transmitting a scheduling instruction which specifies a position of the region to the selected vending robot.

8. The method according to claim 7, further comprising:

allocating at least one vending robot to the plurality of regions according to sale volume information of the plurality of regions.

9. The method according to claim 7, further comprising:

calculating a demand evaluation function for each of the plurality of regions:

$$K_i = m_{1i}\rho_{1i} + m_{2i}\rho_{2i} + m_{3i}N_i,$$

wherein $K_i$ represents a demand evaluation function for an $i^{th}$ region, $\rho_{1i}$ represents a real-time population density for the $i^{th}$ region, $\rho_{2i}$ represents a historical estimation value of a population density for the $i^{th}$ region, $N_i$ represents a real-time sale order volume for the $i^{th}$ region, and $m_{1i}$, $m_{2i}$ and $m_{3i}$ represent corresponding weighting coefficients; and allocating a corresponding number of vending robots to each region according to a value of the demand evaluation function for the corresponding region.

10. The method according to claim 7, further comprising:

transmitting an instruction for returning to a storeroom for maintenance or replenishment to a vending robot with abnormity or shortage in response to receiving an abnormity or shortage message from the vending robot.

11. The method according to claim 7, further comprising:

transmitting an instruction for moving to a charging pile for charging a vending robot with insufficient electric quantity in response to receiving an electric quantity insufficiency message from the vending robot.

12. The method according to claim 7, further comprising:

allowing an application which is installed on a mobile device of a user to be connected to a vending robot via a wireless network, and allowing the user to query a position of the vending robot and information of goods sold by the vending robot and place an order through the application.

* * * * *